United States Patent

[11] 3,619,159

| [72] | Inventor | Daniel A. Shirley<br>Mount Zion, Ill. |
|---|---|---|
| [21] | Appl. No. | 56,035 |
| [22] | Filed | June 30, 1970 |
| [45] | Patented | Nov. 9, 1971 |
| [73] | Assignee | PPG Industries, Inc.<br>Pittsburgh, Pa.<br>Continuation of application Ser. No.<br>641,879, May 29, 1967, now abandoned. |

[54] AUTOMATIC CONTROL FOR GLASS DRAWING PROCESS
5 Claims, 8 Drawing Figs.

[52] U.S. Cl. ..................................................... 65/162,
65/29, 65/199, 65/203, 65/201
[51] Int. Cl. ....................................................... C03b
[50] Field of Search ........................................... 65/29, 199,
162, 203, 201, 164

[56] References Cited
UNITED STATES PATENTS

| 1,761,219 | 6/1930 | Mambourg | 65/201 X |
|---|---|---|---|
| 1,841,660 | 1/1932 | Mambourg | 65/201 X |
| 1,844,049 | 2/1932 | Spinasse | 65/199 |
| 2,080,594 | 5/1937 | Amber | 65/201 |
| 2,774,190 | 12/1956 | Atkeson | 65/162 X |
| 3,223,502 | 12/1965 | Ward et al. | 65/162 X |
| 1,692,585 | 11/1928 | Spinasse | 65/90 X |
| 1,790,774 | 2/1931 | Spinasse | 65/91 |
| 3,511,627 | 5/1970 | Flori | 65/162 |

Primary Examiner—Frank W. Miga
Attorney—Chisholm and Spencer

ABSTRACT: The width of a continuous sheet of glass is maintained substantially constant by automatically controlling the temperature of the edges of the sheet in the forming region. A controller, regulating heating and/or cooling means positioned in heat exchange relationship with an edge of the sheet receives signals from a radiant energy sensor responsive to changes in the lateral position and/or radiant energy emanating from an area of the edge, and regulates the thermal energy supplied to or removed from the edge of the sheet in a portion thereof that is of rapidly changing viscosity, i.e., i.e., between the meniscus and the point at which the glass has cooled to the top of its annealing range in accordance with the changes detected to maintain the temperature of the edge and the width of the sheet substantially constant.

INVENTOR
DANIEL A. SHIRLEY

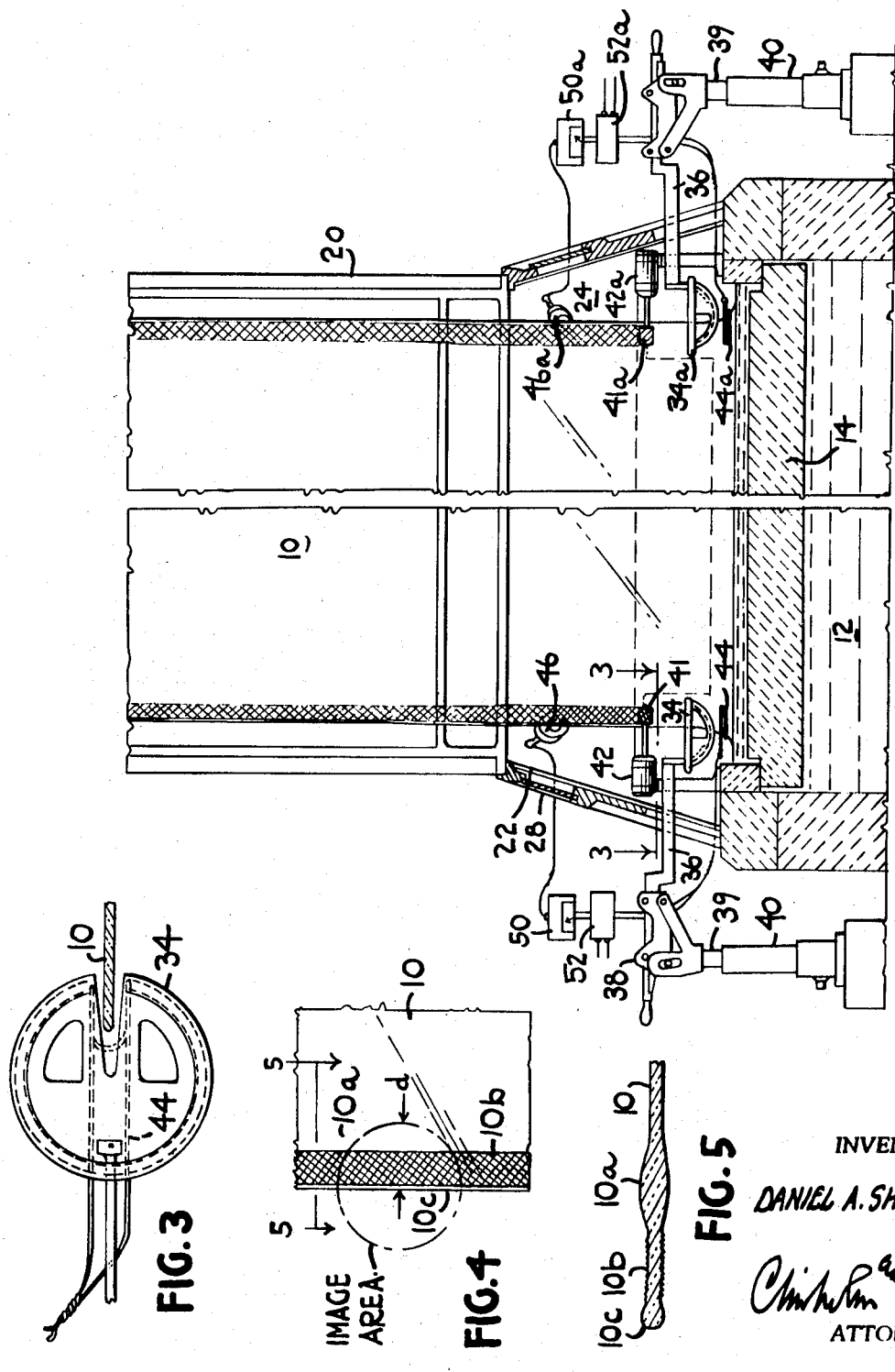

INVENTOR
DANIEL A. SHIRLEY

ATTORNEYS

AUTOMATIC CONTROL FOR GLASS DRAWING PROCESS

This application is a continuation of Ser. No. 641,879 filed May 29, 1967, now abandoned.

BACKGROUND OF THE INVENTION

This invention relates to the manufacture of sheet or window glass wherein a continuous sheet of glass is vertically drawn from the surface of a bath of molten glass. More specifically, this invention relates to automatically controlling the width of a continuous sheet of glass during its manufacture by adjusting or controlling the temperature of the edges of the sheet as the sheet is being formed.

In the Pennvernon or Pittsburgh process of manufacturing sheet glass, to which this invention specifically applies, a sheet of glass is drawn vertically by means of a drawing machine which includes a plurality of drawing rolls, from a bath of molten glass through a drawing chamber defined in part by refractory L blocks. The ribbon is attenuated to its desired thickness by the selection of speed of the drawing machine. The drawing chamber includes a bath of molten glass, the depth of which is substantially the same as that in the glass melting furnace. A refractory draw bar is immersed in the bath of molten glass and defines the plane of the sheet being drawn. Machine coolers, located adjacent the sides of the drawn sheet in the drawing chamber, absorb heat from the formed sheet, so as to reduce its temperature sufficiently that the ribbon can be conveyed from the drawing chamber. At the top of the drawing machine, the ribbon is capped, i.e., cut into large sheets for further handling. A description of the basic process is found in U.S. Pat. No. 1,364,895, issued Jan. 11, 1921, to H. G. Slingluff.

In this process, the temperature-viscosity curve for the glass sheet is quite steep in the forming region near the meniscus from which the sheet is drawn. Temperature variations at the edges of the sheet affect both the width of the sheet and the thickness of the central portion of the sheet. The edges of the sheet are thicker than the central portion of the sheet. As the sheet is being formed, the thickness of the central portion of the sheet is affected by a flow of glass from the edges toward the central portion of the sheet. The flow of glass from the edges is a function of the temperature of the edges of the sheet. Remembering that the sheet is being attenuated, the width of the sheet is also affected by temperature variations at the edges of the sheet.

An increase in the temperature of an edge produces an increased flow of glass from that edge toward the central portion of the sheet and also causes the lateral position of the edge to shift toward the center of the sheet.

If the temperature of an edge decreases, less glass flows toward the center of the sheet, and the lateral position of the edge shifts away from the center of the sheet. Depending upon the direction of movement, i.e., toward or away from the center of the sheet, such changes in the lateral position of the edges respectively produce a ribbon of less or greater width than that desired.

Various means have been employed to hold the edge of the sheet, i.e., to maintain the width of the sheet substantially constant, in the forming region near the meniscus from which the sheet is drawn. One of these means, a metal bowl-shaped member having a slot to receive the edge of the sheet and referred to as an edge bowl, is suggested in U.S. Pat. No. 1,549,513, issued Aug. 11, 1925, to H. G. Slingluff. Many modifications of edge bowls and their mode of operation have since been made. For example, see U.S. Pat. Nos. 1,580,140; 1,827,459; and 1,883,734. Some of the modifications included means to control the temperature of the edge bowl which, in turn, affected the temperature of the edge of the sheet passing through the slot in the edge bowl. Edge bowls with temperature control means, such as heating means, both gas and electric, and cooling means, such as air pipes, are in use today. However, until quite recently, control of the temperature of the edge bowls and the temperature of the edge of the sheet of glass has been accomplished manually. An operator observing changes in the sheet being produced has adjusted the input of heat or cooling air to return the process to the stable condition desired. Manual control has not been entirely satisfactory since it frequently requires several adjustments before the process is returned to the desired stable condition, and much production time is lost during the interim period. Because the width and thickness of the sheet is dependent upon the temperature of the edges of the sheet as the sheet is being formed, the need for a more precise method of controlling the temperature of the edges of the sheet becomes apparent.

A method and apparatus for controlling the temperature of the edge of a sheet of glass is suggested in Canadian Pat. No. 752,308, issued Feb. 7, 1967. In general, this patent suggests an automatic method of controlling the temperature of the edges of the sheet by employing hearing and/or cooling means positioned in heat exchange relationship with the edges of the sheet. The edge temperature moderating means are controlled by a thermocouple positioned in a recess provided in an edge bowl and contacting the edge of the sheet as it is drawn through the edge bowl. Signals from the thermocouple are transmitted to a controller which operates heating or cooling means to maintain the edge at some predetermined temperature.

In the sheet glass drawing process described above, a natural stack is induced by the geometry of the sheet, bath and drawing chamber wherein there is a transfer of heat from the bath and sheet at relatively elevated temperatures to the cooler ambient air within the chamber producing a convective flow of air in the direction of the draw and out of the chamber. The movement of the heated air out of the drawing chamber results in zones of reduced pressure at the base or meniscus of the sheet. Colder air is drawn to the reduced pressure zones and frequently flows from the ends of the drawing chamber to the zones of low pressure at the base of the sheet. These currents naturally flow in the vicinity of the edge bowls and could affect not only the temperature of the edge of the sheet passing through the edge bowl but also the accuracy of a reading obtained from a thermocouple positioned in the edge bowl.

Moreover, the tip of a thermocouple contacting the edge of the glass sheet would tend to wear as the sheet is drawn thereagainst. Canadian Pat. 752,308 suggests the use of a thin metal spacer positioned between the thermocouple and the edge of the sheet so that the spacer rather than the thermocouple will wear, but this requires replacing the metal spacer after a certain length of time. In addition, the temperature of the air currents, and fluctuation thereof, may affect the temperature of the metal spacer resulting in a less accurate reading than if the thermocouple were placed in direct contact with the edge of the sheet. Since the thermocouple would be responsive to air currents in the vicinity of the edge bowl, such currents should be minimized and any attempt at cooling the edge of the sheet in the vicinity of the edge bowl as by directing a cooling fluid against the edge of the sheet should be avoided.

SUMMARY OF THE INVENTION

The present invention provides a method and apparatus for automatically controlling the temperature of an edge of a sheet of glass as the sheet is being formed and thus controlling the width of the sheet through the use of a radiant energy sensing device positioned to monitor the radiant energy emanating from a marginal area of the sheet and/or the lateral position of the edge of the sheet. The radiant energy sensing device automatically regulates heating and/or cooling means positioned in heat exchange relationship with the edge of the sheet in accordance with variations detected from the stable condition desired. By employing a noncontacting radiant energy sensing device, a more accurate and positive control is applied to the drawing process. As will be more fully understood from the following description, the radiant energy sensor does not contact the edge of the sheet and, therefore, is not subject to wear as is the case with a thermocouple contacting the edge of the sheet. Moreover, since the radiant energy sensing device is removed from the area of the edge and is not dependent upon convective or conductive heat transfer, it is not subjected to temperature fluctuations which may arise as a result of air currents in the vicinity of the edge bowl. Because of this, a more accurate control is provided and, in accordance with one embodiment of the present invention, a cooling fluid may be directed against the edge of the sheet in the vicinity of the edge bowl without affecting the accuracy of the edge temperature, sensing device.

To automatically control the temperature of an edge of the sheet, a radiation pyrometer is positioned and focused so an image of the edge of the sheet above the edge bowl is projected on the target area of the pyrometer. The pyrometer is focused so that the image of the edge occupies about 50 percent of the target area of the instrument. When the temperature of the edge increases, the mass of glass at the edge of the sheet tends to flow toward the center of the sheet and the edge itself moves toward the center of the sheet. The net result is a decrease in both the area of the image focused on the target area of the pyrometer and the mass of glass in the image focused on the pyrometer, which together cause a decrease in the signal emitted by the pyrometer. The signal from the pyrometer is transmitted to a controller which modifies the heat input to the edge bowl as by reducing the electrical power applied thereto or the quantity of combustion gases transmitted to an edge bowl burner. With this reduction in thermal energy input, the edge of the sheet becomes cooler and returns to its original position relative to the target area of the pyrometer, which position corresponds to a particular width of the sheet. When the temperature of the edge of the sheet decreases, less glass flows to the center of the sheet and the sheet tends to increase in width. Thus, both the image of the edge on the target area of the pyrometer and the mass of glass in the image increase, producing an increase in the signal emitted by the pyrometer. In this situation, a signal from the pyrometer to a controller modifies the heat input to the edge bowl, as by increasing the electrical power applied thereto or the quantity of gases of combustion transmitted to a burner. The temperature of the edge of the ribbon then increases and returns to its original position which corresponds to a particular width of the sheet.

A still further improved method of controlling the temperature of an edge of the sheet resides in the practice of supplying an excess amount of thermal energy to the edge of the sheet and continually cooling the edge of the sheet in the vicinity of the edge bowl, as by directing a gaseous cooling fluid against the edge of the sheet, to maintain the edge at the temperature desired. Although alternate heating and cooling of the edge of the sheet provides improved performance over conventional operations, the speed of response is not so fast as when the edge of the sheet is continually heated to a temperature greater than that desired and cooled to the desired temperature. This rapid and automatic method of controlling the temperature of an edge can be accurately practiced through the use of a radiant energy sensor such as the pyrometer previously described since the introduction of the gaseous cooling fluid will not affect the accuracy of the pyrometer.

For a more detailed description of this method and apparatus for controlling the temperature of an edge of a sheet of glass, attention is directed to the accompanying drawings and the following description of the preferred embodiments.

BRIEF DESCRIPTION OF THE DRAWINGS

FIG. 2 is a sectional view taken along line 2-2 of FIG. 1 looking toward the major surface of the sheet being drawn.

FIG. 3 is a view taken along line 3-3 of FIG. 2 looking in the direction of the arrows.

FIG. 4 is a view of the edge of the sheet of glass illustrating the image of the edge as focused on the radiation pyrometer.

FIG. 5 is a view taken along line 5-5 of FIG. 4 showing in section the geometry of the edge portion of the sheet of glass.

FIGS. 1 and 2 each show a sheet of glass 10 being drawn from a bath 12 of molten glass in a drawing kiln generally indicated at 13. A draw bar 14 extending traversely of the kiln 13 is submerged in bath 12. The glass sheet 10 in its viscous condition forms a meniscus 16 with the surface of the bath 12, and a sheet 10 is drawn from the bath 12 and through the drawing chamber generally indicated at 22 of the kiln 13 by means of drawing rolls 18 of a conventional drawing machine generally indicated at 20. Water coolers 32 are provided to cool sheet 10 by absorbing radiation therefrom. The drawing chamber 22 as depicted in the drawings is defined by bath 12, conventional L blocks 24, end walls 28, and catch pans 30. As illustrated in FIG. 1, the area between the L blocks 24 and catch pans 30 is enclosed by refractory bricks 26 to seal drawing chamber 22 from the external atmosphere. The refractory bricks 26 are each positioned between an L block 24 and the base frame work of the drawing machine 20 and extend substantially to end walls 28 of the drawing kiln 13. Water-cooled members could, of course, be installed in place of the refractory bricks 26 to provide additional temperature control for the drawing chamber. The base of the drawing machine 20 is substantially closed by means of the generally U-shaped catch pans 30, which are formed as coolers and are positioned so as to catch broken glass which may drop in the machine and thus prevent entry of fragments in the bath 12. These catch pans 30 also extend substantially to the end walls 28 of the drawing kiln 13 and are constructed for the passage of a cooling fluid such as water.

As the sheet of glass 10 is drawn from the meniscus 16, the edges of the sheet pass through slots provided in edge bowls 34 and 34a and are then engaged by water-cooled knurl rolls 41 and 41a driven by motors 42 and 42a. Edge bowls 34 and 34a are metal concave-shaped members having slots provided therein through which the edges of the sheet are drawn and are carried by arms 36 extending from adjustable bracket assemblies 38. Bracket assemblies 38 can be adjusted for longitudinal and tilting movement of the edge bowls and are supported by standards 39 mounted for vertical adjustment in base members 40. Electrical resistance heating elements 44 and 44a are disposed beneath edge bowls 34 and 34a and serve to moderate the temperature of each respective edge of the glass sheet 10. FIG. 3, taken along line 3-3 of FIG. 2, illustrates the relationship of the edge of the glass sheet 10, edge bowl 34, and electrical resistance heating element 44. Electrical resistance heating elements 44 and 44a may be Chromalox elements provided with an Incaloy sheath and bent to provide parallel heating areas adjacent to both surfaces of the edge of the sheet as well as a heated portion extending around the edge of the sheet.

Figure 1:
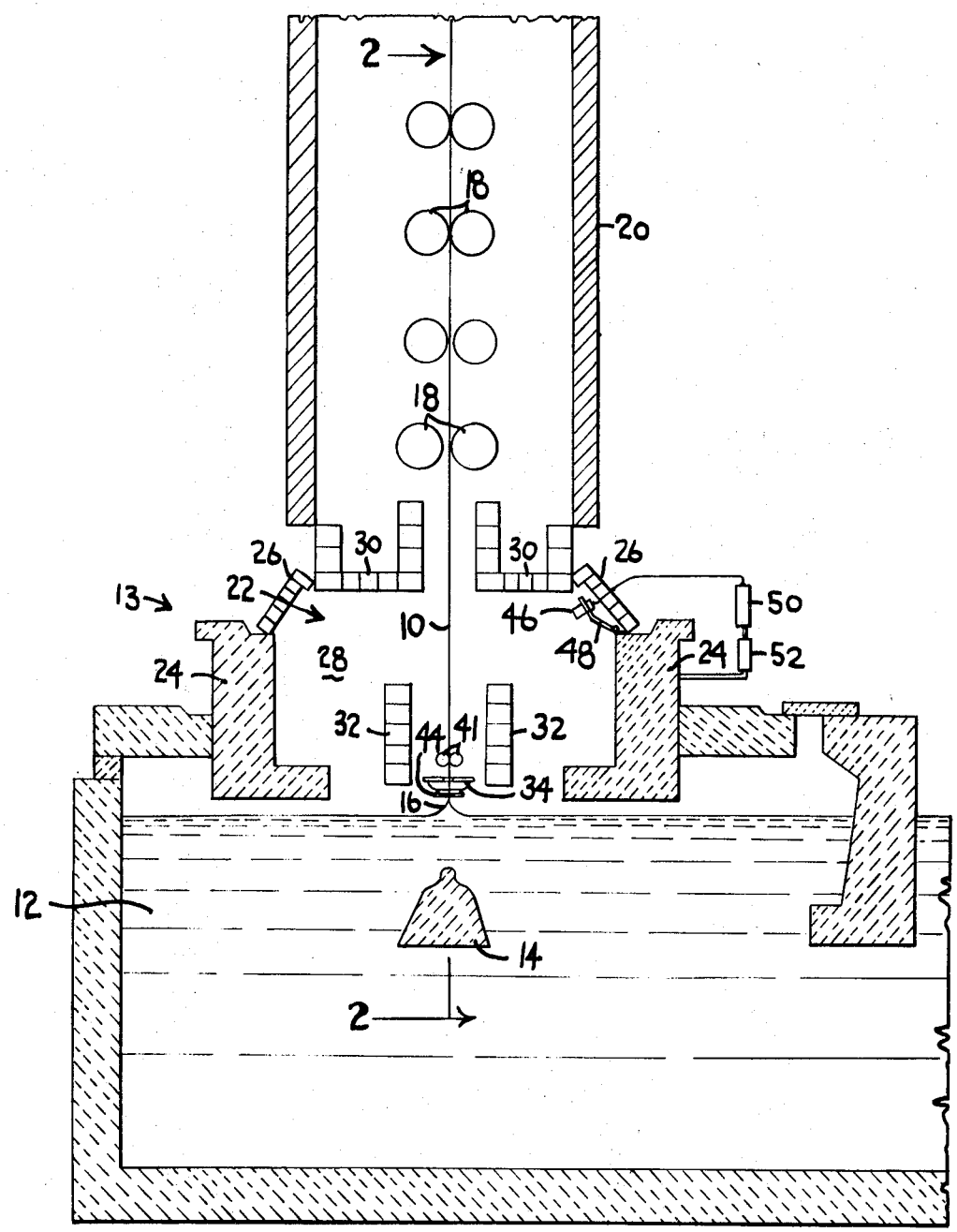
FIG. 1 is a sectional view of a sheet glass drawing apparatus incorporating the features of this invention.

Also illustrated in FIGS. 1 and 2 are radiation pyrometers 46 and 46a mounted on L block 24 by some adjustable means such as a ball and bracket swivel joint 48. Each radiation pyrometer is focused on an edge of the glass sheet 10, viewing it angularly (as can be seen from FIGS. 1 and 2) rather than in a direction parallel to its surface.

Radiation pyrometers 46 and 46a are connected to identical components and function independently in the same manner to control the temperature of each edge of glass sheet 10. Accordingly, the operation of radiation pyrometer 46 will be described with understanding that radiation pyrometer 46a and its related components are set and function in a similar manner to control the temperature of the other edge of the glass sheet 10.

The image of the edge focused on the target area of radiation pyrometer 46 is illustrated by the dotted circle shown in FIG. 4.

FIG. 5 is a sectional view of the edge of glass sheet 10 showing the geometry of the edge after the edge has been drawn beyond water cooled knurl rolls 41. In FIG. 5 there is shown a relatively thick portion 10a of the edge of the sheet, a portion of greatly reduced thickness 10b which results from engagement of the edge with the water-cooled knurl rolls 41, and a bulb edge portion 10c. In the preferred mode of operation, the radiation pyrometer 46 is focused so that an image of the edge of the sheet in the lateral position which corresponds to the desired width of the sheet, including 10a, 10b, and 10c, is projected on and occupies approximately one-half of the target area of the radiation pyrometer as indicated by the distance "d" in FIG. 4.

The radiation pyrometers 46 and 46a each comprise a mirror, a thermocouple at the focal point of the mirror, and an electrical circuit actuated in response to current flowing from the thermocouple. A diffusion type band filter is used between the mirror and the thermocouple to filter out radiation other than that in the 4 to 8 micron wave length. Such devices are well known in the art.

Figure 6:
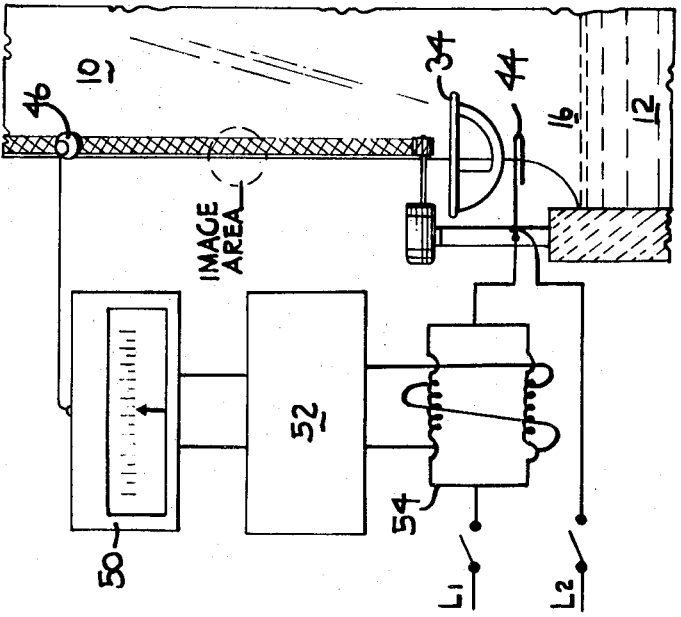
FIG. 6 is a diagrammatic illustration of the manner in which the temperature of an edge of the sheet may be automatically controlled as practiced in one embodiment of this invention.

FIG. 6 is a diagrammatic illustration of one embodiment of this invention. In FIG. 6, electrical current from the thermocouple of radiation pyrometer 46 flows through an electrical circuit connected to a temperature recorder-controller 50 which, in turn, is connected to a controller 52. Controller 52, by means of a saturable core reactor 54, connected in series with the power supply $L_1-L_2$ for electrical resistance heating element 44, controls the electrical current supplied to heating element 44 in accordance with the signal emitted by radiation pyrometer 46. Although other units could be employed, a "Series 60 Current-Adjusting Type Control Unit," sold by the Leeds and Northrup Company of Philadelphia, Pa., and described in their Directions Manual No. 077993, has been employed in the practice of this invention.

Figure 7:
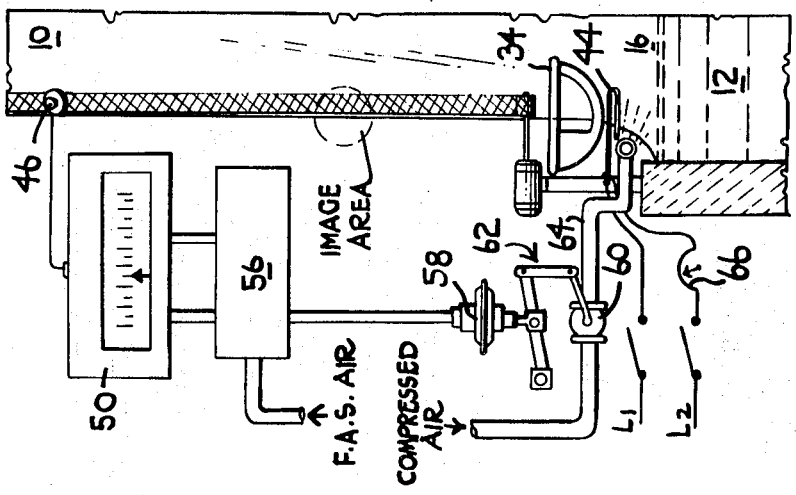

FIG. 7 illustrates an alternate embodiment of this invention. In FIG. 7 an electrical resistance heating element 44 is powered by a source of electrical energy $L_1-L_2$ which may be adjusted by rheostat 66 to supply an excess amount of thermal energy to the edge of the glass sheet 10. The edge is cooled to the desired temperature by means of a gaseous cooling fluid such as air, delivered by a conduit 64 against the edge of the meniscus 16 of the sheet 10. Compressed air is delivered through conduit 64 and the rate of flow is controlled by air flow control valve 60 which is automatically regulated by a diaphragm actuated air motor 58 and a pin-and-lever linkage 62. In this control arrangement radiation pyrometer 46, focused on an edge portion of the sheet of glass 10, emits a signal to recorder-controller 50 which is connected to electro-pneumatic converter 56. A filtered air supply is provided to electro-pneumatic converter 56 which is moderated in accordance with the signal emitted by the radiation pyrometer 46 to control diaphragm actuated air motor 58 in response to changes in the radiant energy emanating from the edge of the glass sheet 10. A conduit open to the atmosphere may be employed in place of the source of compressed air. The natural stack of the machine will draw sufficient air to cool the edge of the sheet. The valve 60 would, of course, control the rate of air flow.

Figure 8:
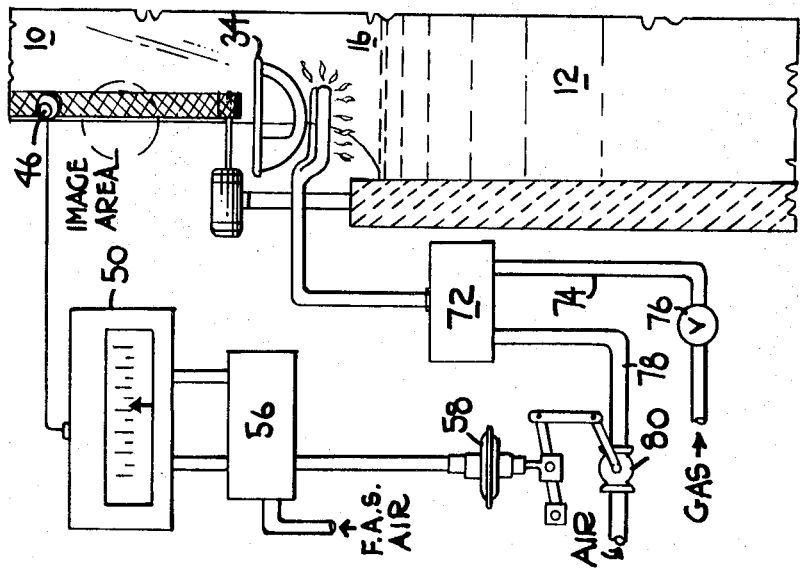
FIGS. 7 and 8 are similar to FIG. 6 and illustrate alternate embodiments for automatically controlling the temperature of an edge of a sheet of glass.

FIG. 8 illustrates another control arrangement. In FIG. 8 there is shown a horseshoe-shaped combustion gas burner 70 disposed beneath edge bowl 34 and around the edge of the sheet 10. Gases of combustion from aspirator mixer 72 are transmitted to burner 70. Natural gas is delivered by means of conduit 74 to aspirator mixer 72. An atmospheric regulator valve 76 is provided for gas conduit 74. Air is delivered to aspirator mixer 72 by means of conduit 78. The flow of air is controlled by air flow control valve 80 in a manner similar to that described for air flow control valve 60 in FIG. 7. The control arrangement of FIG. 8 is such that the amount of air metered by control valve 80 to aspirator mixer 72 will be regulated by diaphragm actuated air motor 58 in accordance with variations in the radiant energy detected by radiation pyrometer 46.

DESCRIPTION OF THE PREFERRED EMBODIMENTS

The following is an example, by way of illustration only, of a preferred embodiment of the present invention.

A sheet of glass of a constant width of approximately 133 inches and 3/16-inch thick is continuously formed by mechanically drawing it from a partially-enclosed bath of molten glass maintained at a temperature of approximately 1,900° F. The composition of the glass is:

| Ingredient | Percent By Weight |
| --- | --- |
| $SiO_2$ | 71.38 |
| $Na_2O$ | 12.79 |
| CaO | 9.67 |
| MgO | 4.33 |
| $Na_2SO_4$ | 0.75 |
| NaCl | 0.12 |
| $Fe_2O_3$ | 0.15 |
| $Al_2O_3$ | 0.81 |

The process is adjusted as by manually moderating the temperature of the edges of the sheet or varying the speed of draw to produce a sheet of glass having the width and thickness desired. Each of a pair of radiation pyrometers are then focused on an edge of the sheet. The radiation pyrometers are focused so that an area of each edge about five inches above the water cooled knurl rolls occupies approximately one-half the target area of each instrument.

Each radiation pyrometer is part of an independent electrical control circuit comprising a recorder-controller, a controller, and a saturable core reactor connected in series with an electrical resistance heating element disposed around the edge of the sheet just beneath the edge bowl as illustrated in FIG. 6.

The preferred temperature of the edges of the sheet at the level in the drawing chamber where the radiation pyrometers are focused is 1,100° F. The recorder-controllers are each set at this temperature and the control circuits are set on automatic control. The radiation pyrometers continually sense the radiant energy emanating from the areas at the edges of the sheet and induce a flow of electrical energy to the recorder-controllers. The electrical currents or signals emitted by the radiation pyrometers are dependent upon the quantity of radiant energy incident on the thermocouples of the radiation pyrometers.

The radiation pyrometers are responsive to radiant energy emanating from an edge of a glass sheet when the temperature of the edge is within the range of 400° F. to 1,400° F. Over this temperature range the output signal varies from 0 to 2 mv. More specifically, for the temperature range within which the temperature of the edge is preferably maintained, the output signals of the radiation pyrometers are approximately as follows: 1,050° F.–1.00 mv; 1,075° F.–1.05 mv; 1,100° F.–1.10 mv; 1,125° F.–1.16 mv; and 1,150° F.–1.20 mv.

The signals emitted by the radiation pyrometers are transmitted to the recorder-controllers which, if the signals increase or decrease, respectively increase or decrease the power supplied to an electrical resistance heating element to moderate the temperature of the edge and return the edge to its preferred temperature and lateral position.

In this mode of operation it should be noted that the radiation pyrometers do not respond to a change in temperature alone, but rather respond to a change in the mass of glass being monitored, which change is induced by a change in the temperature of the edge. When the temperature of the edge changes, the mass of glass being monitored changes due to the previously described change in the rate of flow of glass from the edge of the sheet and shift in the lateral position of the edge. Because of the combined effect of these concurrent changes, the radiant energy incident on the pyrometers and the output signals change more rapidly than if changes in the absolute temperature of the edges alone were being detected. Accordingly, the process can be more precisely controlled through the use of radiation pyrometers as edge position indicators in the manner previously described.

The control arrangement of FIG. 7 is operated by first adjusting the rheostats to supply excess amounts of thermal energy to the edges of the sheet by means of the electrical resistance heating elements. The air streams directed against the edges of the meniscus are then adjusted by means of the electro-pneumatic converters so that a reading of 1,100° F. is obtained on the recorder-controllers by means of the radiation pyrometers. The electro-pneumatic converters are then set on automatic control to moderate the air supplied to the diaphragm actuated air motors in accordance with variations in the radiant energy emitted by the edges as detected by the radiation pyrometers.

Both of the above-described control arrangements provide improved process control. However, the response time for correcting the temperature of the edge after a change in temperature has been detected is greater for the control arrangement of FIG. 6 than it is for that of FIG. 7. Varying the flow rate of a cooling fluid against the edge of the sheet as illustrated in FIG. 7 produces a more rapid response in the temperature of the edge of the sheet being drawn. The control arrangement of FIG. 7 is thus preferred to that of FIG. 6 since the former provides a more rapid return to the stable condition desired whenever variations have been detected.

Once the relationship between the temperature of an edge and the width of the sheet and the control arrangements described above are fully appreciated, it becomes apparent that the lateral position or radiant energy emanating from a marginal portion of a sheet of glass may be monitored by methods other than those expressly described.

Although it is preferred to focus the radiation pyrometers on the edges of the sheet to simultaneously monitor changes in the lateral position of the edge and radiant energy emanating therefrom, the radiation pyrometers may be focused on other areas of the marginal portions of the sheet. For example, the radiation pyrometers may be focused on areas of the sheet inside the relatively thick edge portions 10a to monitor the radiant energy emanating from those areas of the sheet. If the temperature of the edges increases, the radiant energy emanating from the said areas of the sheet would increase due to the transfer of thermal energy from the edge of the sheet and the increased flow of glass from the thick edge portions toward the center of the sheet. The signals emitted by the radiation pyrometers would increase in accordance with the radiant energy increase and by means of suitable control devices would serve to reduce the amount of thermal energy supplied to the edges or otherwise cool the edges to their preferred temperatures. If the temperatures of the edges decreases, the radiation pyrometers would detect less radiant energy emanating from the said areas of the sheet and automatically apply additional thermal energy to the edges of the sheet or reduce the rate at which the edges are being cooled.

It should be noted that the signal emitted by a radiation pyrometer focused on a marginal area of the sheet inside the relatively thick edge portion increases with an increase in edge temperature whereas the signal from a radiation pyrometer focused on the edge or on the relatively thick edge portion of the sheet decreases with an increase in edge temperature. This inverse relationship is due to the previously described flow of glass from the edge of the sheet and further emphasizes that the method of control described herein is dependent upon changes in the rate of flow of molten glass from the edge of the sheet rather than the absolute temperature of the edge per se.

It should also be noted that this method of control has been practiced during production of a continuous glass sheet 133 inches wide with a radiation pyrometer focused on an area of the sheet 19 inches in from the edge of the sheet. Thus, when used herein, a "marginal portion" of a continuous glass sheet is intended to mean about one-quarter of the width of the sheet measured normal to the edge of the sheet.

An alternative is to employ a radiant energy sensing device to monitor the lateral position of the edge which may or may not be responsive to the radiant energy emanating from the edge per se. For example, a beam of collimated light from a source facing one surface of the glass sheet may be directed toward one or more photocells located on the other side of and facing the other surface of the glass sheet. The collimated light source and photocells are positioned so that changes in the lateral position of the edge of the sheet would affect, i.e., disrupt, varying the intensity of, or initiate, the radiant energy incident on a photocell. Electrical signals emitted by the photocell are transmitted to a controller which, in turn, moderates the temperature of the edge in accordance with changes detected in the lateral position of the edge.

I claim:

1. In an apparatus for vertically drawing a continuous sheet of glass having opposing major surfaces and longitudinally extending edge portions including a molten glass reservoir, a drawing kiln positioned above said reservoir, a drawing machine positioned above said drawing kiln for continuously drawing said glass sheet vertically from said reservoir through said drawing kiln and said drawing machine, and edge bowl means positioned in said drawing kiln above the molten glass in said reservoir adjacent each edge of said continuous glass sheet, said edge bowl means each having slotted openings for receiving the adjacent edge portion of said glass sheet, the improvement comprising;

A. radiant energy reflecting means for collecting and focusing to a focal point radiant energy from said glass sheet positioned adjacent each edge of said glass sheet, said radiant energy reflecting means each being mounted in said drawing kiln above said edge bowl means at a location spaced from a major surface of said glass sheet, each said radiant energy reflecting means having a target area positioned substantially parallel and in spaced relation to said major surface of said glass sheet for receiving radiant energy from said glass sheet, said target area being positioned in said drawing kiln in a location such that a portion of said target area is opposite an area of said major surface of said glass sheet adjacent to and extending inwardly from an edge of said glass sheet, B. radiation pyrometer means mounted within said drawing kiln adjacent each of said radiant energy reflecting means and in spaced relation with respect to the adjacent major surface of said glass sheet, each said radiation pyrometer means being positioned at the focal point of the adjacent radiant energy reflecting means, said radiation pyrometer means providing electrical impulses proportionate to the amount of radiant energy focused thereon by said radiant energy reflecting means, C. means responsive to said electrical impulses for indicating variations in the amount of radiant energy focused on said radiation pyrometer means resulting from lateral movement of the edge of said glass sheet opposite said target area, D. means for heating the edges of said glass sheet mounted in said drawing kiln beneath each said edge bowl means, and E. means for controlling the heat output of each said heating means, whereby, the width of said glass sheet is maintained so that the area thereof opposite said target area is maintained in a position such that said portion of said target area is opposite said area during the continuous drawing of said glass sheet.

2. An apparatus for vertically drawing a continuous sheet of glass as claimed in claim 1, including means responsive to said electrical impulses for recording variations in the amount of radiant energy focused on said radiation pyrometer means resulting from lateral movement of the edge of said glass sheet opposite said target area.

3. An apparatus for vertically drawing a continuous sheet of glass as claimed in claim 1, including means responsive to said electrical impulses provided by said radiation pyrometer means for continuously controlling each of said means for controlling the heat output of each of said heating means.

4. An apparatus for vertically drawing a continuous sheet of glass as claimed in claim 1 including means for delivering a flow of a cooling fluid on the edges of said glass sheet mounted in said drawing kiln beneath each of said means for heating the edges of said glass sheet.

5. An apparatus for vertically drawing a continuous sheet of glass as claimed in claim 4, including means responsive to said electrical impulses provided by said radiation pyrometer means for controlling the rate of flow from each of said means for delivering a flow of cooling fluid on the edges of said glass sheet.

* * * * *